US006404749B1

(12) United States Patent
Falk (10) Patent No.: US 6,404,749 B1
(45) Date of Patent: Jun. 11, 2002

(54) METHOD FOR PROVIDING CONNECTIONLESS DATA SERVICES OVER A CONNECTION-ORIENTED SATELLITE NETWORK

(75) Inventor: Aaron D. Falk, San Pedro, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/262,890

(22) Filed: Mar. 8, 1999

(51) Int. Cl.7 .............................................. H04L 12/28
(52) U.S. Cl. ....................... 370/325; 370/349; 370/395; 370/474
(58) Field of Search ................................. 370/316, 349, 370/389, 395, 401, 474, 466, 325; 455/12.1, 427, 428, 429, 430

(56) References Cited

U.S. PATENT DOCUMENTS

| 5,432,777 A | | 7/1995 | Le Boudec et al. | |
| 5,459,720 A | * | 10/1995 | Iliev et al. | |
| 5,517,497 A | | 5/1996 | Le Boudec et al. | |
| 6,157,621 A | * | 12/2000 | Brown et al. | ............... 370/310 |
| 6,178,169 B1 | * | 1/2001 | Hodgkinson et al. | ....... 370/395 |
| 6,310,893 B1 | * | 10/2001 | Yuan et al. | .................. 370/474 |

* cited by examiner

Primary Examiner—Douglas Olms
Assistant Examiner—Ken Vanderpuye
(74) Attorney, Agent, or Firm—Connie Thousand (57) ABSTRACT

A method for transferring a data packet, in a connectionless manner between a first source terminal and a first destination terminal, in a communications network which supports connection-oriented communications. The data packet is segmented into one or more cells with a portion of each cell comprising the cell header. A preselected value is place into the cell type identifier field to indicate that the cell is to be sent in a connectionless mode. A source terminal identifier is assigned to each source terminal in the network and the source terminal identifier corresponding to the first source terminal is placed into each cell header. A preselected value is placed into the information field to be used by the network to route the cells from the first source terminal to the first destination terminal. The cells are routed though the network and broadcasted over the downlink antenna beam which covers the first destination terminal. All destination terminals within the downlink antenna beam receive all the cells and sort the cells by source terminal identifier.

25 Claims, 4 Drawing Sheets

| Destination Terminal Identifier Look-up Table | |
|---|---|
| Destination Address | Destination Terminal Identifier Valve |
| 128.3.20.4 | 10 |
| 128.3.40.5 | 11 |
| 138.2.20.3 | 12 |
| ⋮ | ⋮ |
| 139.12.40.72 | 4010 |
| 162.20.30.8 | 4011 |

FIG. 4

| Routing Tag Look-up Table ||
| Destination Address | Routing Tag Valve |
| --- | --- |
| 128.3.20.4 | 332 |
| 128.3.40.5 | 51 |
| 128.2.20.3 | 3261 |
| ⋮ | ⋮ |
| 139.12.40.72 | 45231 |
| 162.20.30.3 | 3 |

| Satellite Look-up Table | |
|---|---|
| Destination Terminal Identifier | Local Routing Valves |
| 10 | 1 (Crosslink) |
| 11 | 1 (Crosslink) |
| 12 | 2 (Downlink) |
| ⋮ | ⋮ |
| 300 | 2 (Downlink) |
| 301 | 3 (Downlink) |

| Satellite Look-up Table | |
|---|---|
| Destination Terminal Identifier | Local Routing Valves |
| 10 | 2 (Crosslink) |
| 11 | 2 (Crosslink) |
| 12 | 1 (Downlink) |
| ⋮ | ⋮ |
| 300 | 1 (Downlink) |
| 301 | 1 (Downlink) |

FIG. 6b

METHOD FOR PROVIDING CONNECTIONLESS DATA SERVICES OVER A CONNECTION-ORIENTED SATELLITE NETWORK

This invention was made with Government support under Contract number F04701-97-C-0025 awarded by the Department of the Air Force. The Government has certain rights in this invention.

BACKGROUND OF THE INVENTION

The present invention relates generally to data transfer systems, and more particularly to a method for sending data in a connectionless manner in a network which supports connection-oriented communications.

Connection-oriented networks are traditionally associated with telephony and other types of communications where an association between a sender and receiver exists for a relatively long period of time (i.e. on the order of minutes). Connection-oriented communications are used when resources need to be assigned to guarantee that the data is received and processed by the proper destination terminal. Connection-oriented communications are typically used for data which is sensitive to delay and/or delay variation. Many networks which support connection-oriented communications use the Asynchronous Transfer Mode (ATM) protocol for data message transfers because it is a relatively fast, highly reliable switching protocol. A more detailed discussion of the ATM protocol can be found in CCITT, "Draft Recommendation I.363". CCITT Study Group XVIII, Geneva, Jan. 19–29, 1993.

The process of exchanging information on a connection-oriented network usually requires some signaling between the source and destination (and possibly a network manager) to negotiate the parameters of the connection before any useful data is exchanged. This is efficient when the delay required for signaling is small relative to the duration of the time spent to exchange information.

In contrast, connectionless networks such as the global Internet, are traditionally associated with computer networks and other types of communications where an association between a sender and receiver exists on a per-packet basis (i.e. on the order of milliseconds). Connectionless communication networks do not utilize advance signaling before sending data; therefore, there is no opportunity for the network to evaluate whether a given transmission can be guaranteed to reach its destination in a timely manner. Connectionless communications are typically used for lower priority data, such as Internet Protocol (IP) data, where it is not imperative that data will arrive at and be processed by the proper destination terminal in a timely fashion.

Once a geosynchronous satellite is introduced into the path between the source and destination or between the source and the network manager, the cost in delay of performing connection-oriented communications is exacerbated. For connection-oriented communications over a satellite with an on-board cell relay switch, to establish a communications link between a source terminal and a destination terminal, the following setup procedure steps need to be conducted:

a) A request is sent from the source terminal over the satellite to the Network Operations Center (NOC) asking for a connection identification address (CID) for a connection to the destination terminal and a channel for communications.

b) A channel, a CID and a path through the satellite cell switch are allocated by the NOC.

c) The channel allocation, CID, and path through the satellite cell switch are sent to the satellite.

d) The channel allocation and CID are sent to both the source terminal and the destination terminal.

Although this set-up procedure requires a significant amount of time, it accomplishes many purposes the most significant of which is that a path from a satellite uplink to a satellite downlink is created through the satellite network for the routing of cells with the header CID. In addition, the source terminal will know that it can use the allocated channel for communication with the desired destination terminal; the desired destination terminal will listen only to the allocated channel and accept only the packets with the proper CID in the header; and, other destination terminals do not use their resources to accept packets not intended for their use freeing up resources for communications with other source terminals.

After the set-up procedure is completed, the following additional steps are performed in order to send a message from the source terminal to the destination terminal:

a) The source terminal divides the message into one or more cells, each of which is of a length compatible with the data message transfer protocol used by the network. For networks which use the ATM protocol, this step is conducted in accordance with a predetermined ATM Adaptation Layer (AAL) protocol. As required by most protocols, each cell includes a header.

b) The source terminal places the allocated CID into the proper location in the header of each cell.

c) The cells are sent to a satellite.

d) Each cell is routed to the downlink antenna which covers the desired destination terminal.

e) The cells are broadcast by the downlink antenna.

f) The cells with the proper CID in the header are accepted by the destination terminal and reassembled back into the original massage.

The CID is an address identifying the connection between a specific source terminal and destination terminal. It is temporary and used for a single communication. After the communication between the source terminal and the destination terminal is complete, the connection is broken and the channel can be reused for another communication either between the same source and destination terminal or a new source and destination terminal. The CID can also be reused for another communication either between the same source and the destination terminal, a new source and the destination terminal or a new source and a new destination terminal.

In contrast, for connectionless communications, the message is sent from the source terminal to the destination terminal without first completing the set-up portion of the procedure. Sending a message in a connectionless communications networks takes much less set-up time than sending a message in a connection-oriented communications system since the set-up procedure with a NOC or network manager is not required. However, in a connectionless communications system there is no guarantee that the downlink antenna will have the channel capacity available to broadcast the packets to the destination terminal nor is there a guarantee of resources in the on-board cell switch.

With the advent of the Internet, the demand to transport data in a connectionless manner has increased tremendously. Therefore, it would be advantageous to develop a scheme to send data, such as IP data, in a connectionless manner over a system which supports connection-oriented communications. It would also be advantageous to do so in a manner which is compatible with the ATM protocol used in many connection oriented systems.

U.S. Pat. Nos. 5,432,777 and 5,517,497 disclose a method for sending data in a connectionless manner over a connection-oriented network which includes assigning a routing identifier (RI) to each terminal in the network and placing a destination terminal RI in the header of each cell of the message. For this method, the source terminal consults a global look-up table which correlates each terminal in the system with an RI in a unique mapping arrangement. The source terminal places the destination terminal RI in the header of each cell. The cells are sent to a node in the system. Each node must read the destination terminal RI in the header of each cell and determine the proper routing sequence required for the cells to be transmitted to the proper destination terminal.

The cells are routed through each satellite to the desired destination terminal. The destination terminal only accepts cells having its individual destination terminal RI in the headers. After the data is routed to the proper destination terminal, the destination terminal typically must separate, or demultiplex, the cells since cells sent from different source terminals are multiplexed together before arriving at the destination terminal. To separate multiple streams of data coming from different source terminals to the same destination terminal, the '777 and '497 patents disclose using a multiplexing identification (MID) field in the cell headers where the value of the MID field allows, at the destination side, to identify the cells which belong to the same connectionless message. This value has to be unique. The '777 and '497 patents prefer that the source RI value be used as the MID and either the last ten bits of the RI value are taken as the MID or, the header is extended to allow more bits to be used. Using the MID field to demultiplex cells from different sources restricts the ATM Adaptation Layer (AAL) protocol which can be used to demultiplex the cells to the ATM Adaptation Layer 3/4 (AAL3/4) protocol. A more detailed discussion of AAL protocols can be found in CCITT, "Draft Recommendation I.363". CCITT Study Group XVIII, Geneva, Jan. 19–29, 1993. The AAL3/4 protocol has a MID field, but, the newer ATM Adaptation Layer 5 (AAL5) protocol does not. Therefore, the method specified in the '777 and '497 patents does not support the newer AAL5 protocol which is typically the adaptation layer protocol of choice for IP data transfers among those skilled in the art. Thus, the scheme defined in the '777 and '497 patents are deficient for various network environments.

What is needed therefore is a method for sending data in a connectionless manner over a network which supports connection-oriented communications where the method is free of a need for a global look-up table, is compatible with a network which uses the ATM for data message transfers, and, supports the use of higher order adaptation layer protocols, in particular, the AAL 5 protocol.

SUMMARY OF THE INVENTION

The preceding and other shortcomings of the prior art are addressed and overcome by the present invention which provides, in a first aspect, a method for transferring a data packet in a connectionless manner between a first source terminal and a first destination terminal, in a communications network which supports connection-oriented communications. The communications network has a plurality of source terminals, destination terminals, uplink and downlink antenna beams with one uplink antenna beam covering the source terminal and one downlink antenna beam covering the destination terminal. The data packet to be sent includes a destination address identifying a user for which the data packet is meant.

The data packet is segmented into one or more cells, each of which has a predetermined length, with a portion of each cell comprising the cell header. Each cell header is formatted with sufficient information to route the cells from the first source terminal to the first destination terminal. To do so, a cell type identifier field, a source terminal identifier field and an information field are defined within each cell header. A preselected value is placed into the cell type identifier field of each cell header to indicate that the cell is to treated in a connectionless manner. A source terminal identifier value is assigned to each source terminal in the network and the source terminal identifier value corresponding to the first source terminal is placed in the source terminal identifier field of each cell header. A preselected value is placed into the cell type identifier field to indicate that the data packet is to be sent in a connectionless mode. A predetermined value is placed into the information field of each cell header to be used by the network to route the cells from the first source terminal to the first destination terminal.

The cells are routed though the network and broadcasted over the downlink antenna beam which covers the first destination terminal. All destination terminals within the downlink antenna beam receive all the cells and sort the cells by source terminal identifier.

In a first aspect, the destination terminals determine for whom the cells are meant from the value in the information field. In a second aspect, the destination terminals determine for whom the cells are meant from the destination address. In a third aspect, a cell loss priority field and payload type identifier field are additionally identified in each cell header and are formatted with predetermined values which are consistent with a preselected AAL protocol. The cells are sent through a network which uses the ATM for data message transfers and additionally supports connection-oriented communications.

BRIEF DESCRIPTION OF THE DRAWINGS

Reference is now made to the detailed description of the preferred embodiments illustrated in the accompanying drawings, in which.

DETAILED DESCRIPTION OF THE PREFERRED EMBODIMENTS

The present invention overcomes the limitations of the prior art by providing a method for transferring a data packet such as IP protocol data packet, between a source terminal and a destination terminal, over a network which supports connection-oriented communications by formatting each cell header with sufficient information to route the data through the network in a connectionless manner. For the preferred embodiment of the invention, the method provides for data message transfers in a connectionless manner in a network which uses the ATM and a preselected AAL protocol for data message transfers.

Figure 1:
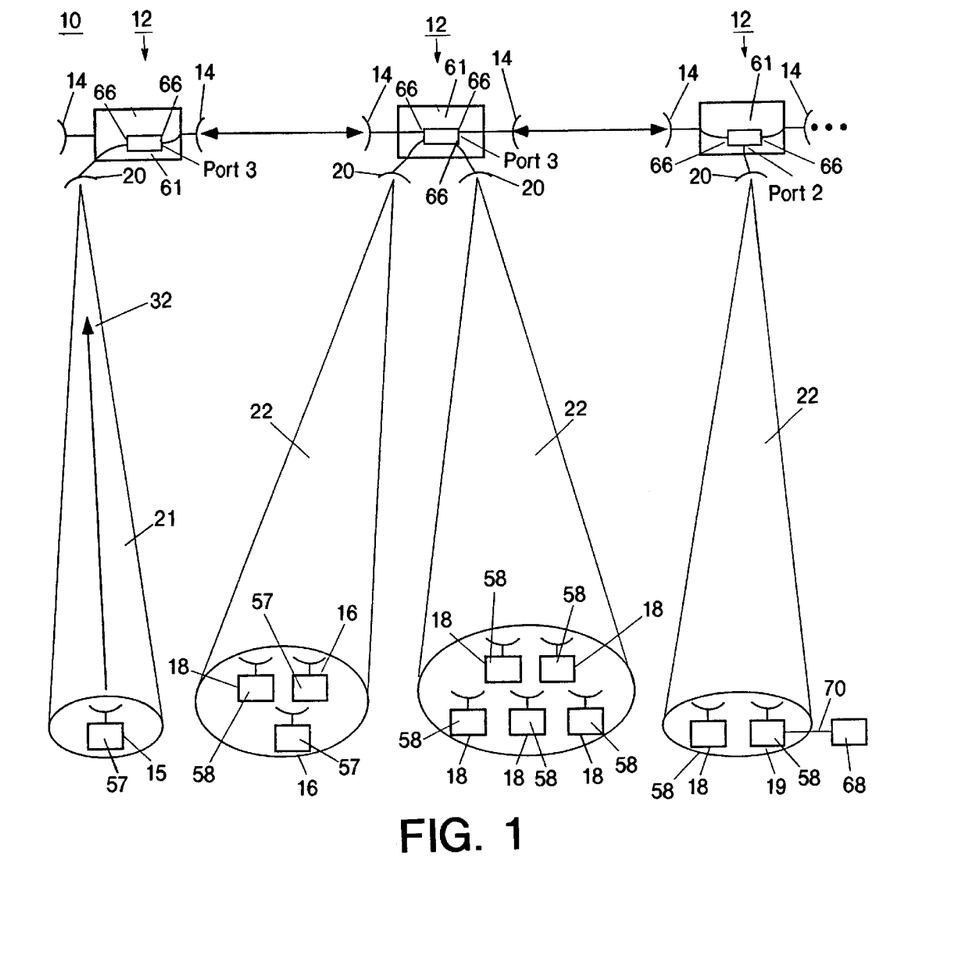
FIG. 1 is a schematic diagram of a communications network in which the present invention may be used.

FIG. 1 shows the configuration of a communications network 10 in which the present invention may be used. The network 10 supports connection-oriented communications. For the preferred embodiment of the invention, the network 10 uses the ATM protocol for data message transfers. The network 10 includes several satellites 12 which are interlinked by the use of the crosslink antennas 14. The network 10 includes a plurality of source terminals 15, 16 and destination terminals 18, 19. Any source terminal 15, 16 can function as a destination terminal 18, 19 and vice versa. The source 15, 16 and destination 18, 19 terminals are linked to the satellites 12 by way of the antennas 20 which provide uplink 21 and downlink 22 antenna patterns. Each antenna 20 has an antenna beam 21 or 22 which can cover a plurality of source 15 and 16 and destination 18, 19 terminals. The antennas 20 can also be multiple beam antennas where each antenna 20 provides a multiplicity of antenna beams 21, 22. The antennas 20 can also be dual uplink/downlink antennas, dedicated uplink and downlink antennas or the like. In addition, uplink channels may be shared or dedicated to a single source terminal 15 or 16.

Each satellite 12 can have one or more crosslink antennas 14 making a variety of satellite network configurations such as a star network or a ring network possible. However, the invention will be explained for the general case of a linear network 10 shown in FIG. 1.

Figure 2:
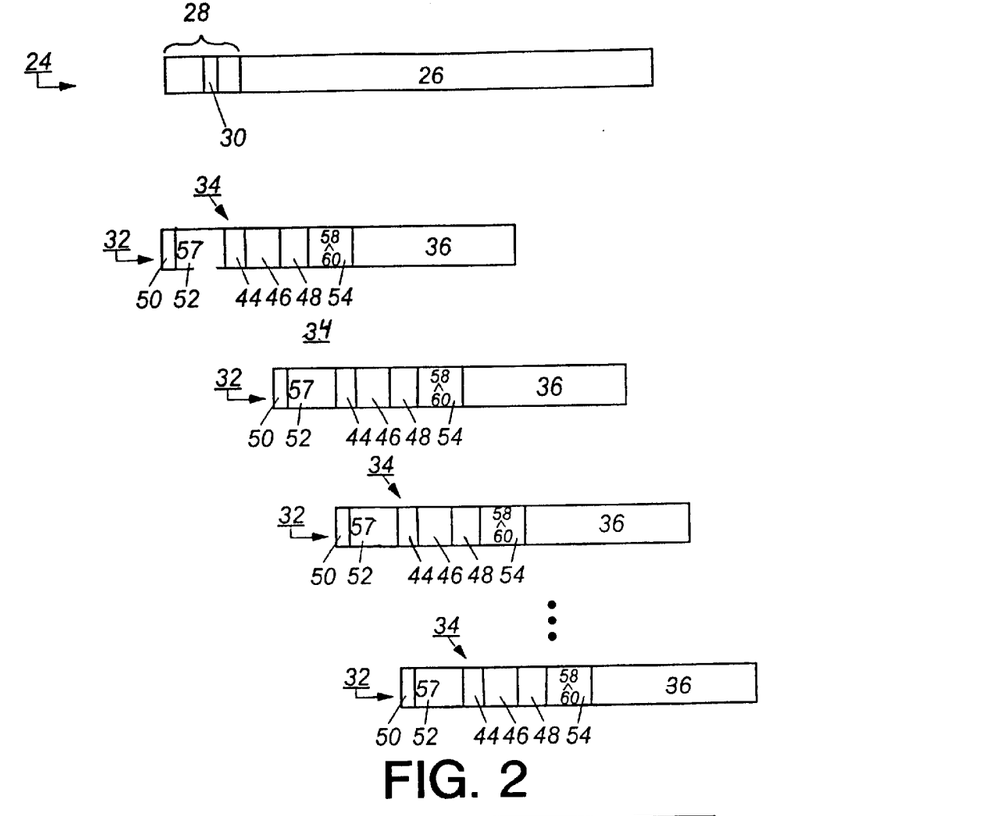
FIG. 2 shows a data packet and the cells formed after segmentation of the data packet per an adaptation layer segmentation process.

As shown in FIG. 2, a data packet 24, which can be an IP data packet or any data packet which is desired to be sent over the network 10, includes a message body 26 and a message header 28. The message header 28 includes the destination address 30 identifying a user for which the data packet 24 is meant.

Referring to FIGS. 1 and 2, the first step of the process relates to segmenting the data packet 24 into appropriately sized cells 32 which can be sent over the network 10. To do so, the data packet 24 is segmented into one or more cells 32 with each cell 32 being of a preselected length of which a portion comprises the cell header 34. The length of each cell 32 is chosen to be compatible with the particular data message transfer protocol used by the network 10. For the preferred embodiment of the invention, the length of each cell 32 is selected to be compatible with the ATM protocol used by the network 10. A more detailed discussion of ATM protocols and the ATM segmentation and repackaging process can be found in CCITT, "Draft Recommendation I.363". CCITT Study Group XVIII, Geneva, Jan. 19–29, 1993. In particular, the cells 32 are sized consistent with the ATM Adaptation Layer 5 (AAL5) protocol which specifies that the data packet 24 be segmented into one or more cells 32 with each cell 32 having a length of 53 octets of which a portion comprises a cell header 34.

Figure 3:
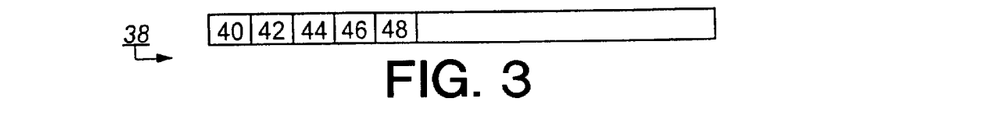
FIG. 3 shows an example of a typical ATM header.

The next step in the process relates to assigning fields within each cell header 34. For the preferred embodiment of the invention, the assignments are conducted in such a manner that the cells 32 and cell headers 34 are compatible with the preselected ATM protocol. Referring to FIG. 3, ATM protocols define fields within a typical ATM cell header 38. These fields include a virtual path identifier (VPI) field 40, a virtual communication identifier (VCI) field 42, a header error correction (HEC) field 44, a cell loss priority field 46 and a payload type identifier field 48. The VPI 40 and VCI 42 fields are used for connection-oriented communications, the HEC field 44 is used for header error correction, the cell loss priority field 46 is used to perform ATM traffic management and the payload type identifier field 48 is used to identify the last cell in a message using the AAL5 segmentation and reassembly protocol.

Referring to FIGS. 2 and 3, for the preferred embodiment of the invention, the cell loss priority 46 and payload type identifier 48 fields are retained in each cell header 34 and optionally, the HEC field 44 is additionally retained. If the HEC field 44 is not retained, the satellite network 10 (FIG. 1) should provide sufficient error protection to prevent unacceptable header errors. The VPI 40 and VCI 42 fields are not retained in each cell header 32. Instead, three additional fields 50, 52 and 54 are defined. The additional fields 50–54 include a cell type identifier field 50, a source terminal identifier field 52, and an information field 54. The overall length of each cell is maintained at a length compatible with the preselected ATM protocol, which is 53 octets for the AAL5 protocol.

For one embodiment of the invention, each cell header 34 comprises the first five octets of each cell 32 and the cell loss priority 46, payload type identifier 48, cell type identifier field 50, source terminal identifier 52 and information fields 54 are located within each cell header 34. For a another embodiment of the invention, the HEC field is also included in the five octet header of each cell 32. For still another embodiment of the invention, each cell header 34 encompasses more than the first five octets of each cell 32 but, each cell 32 remains at the predetermined length which is 53 octets for the AAL5 protocol. For this embodiment, the cell loss priority field 46, payload type identifier field 48, cell type identifier field 50 and source terminal identifier field 52 are located within the first five octets of each cell 32 and the information field 54 is located within the header 34 but after the first five octets of each cell 32. This increases the size of one or more of the fields 44–56. In particular, this allows for the size of source terminal field 52 and the information field 54 to be increased which can be advantageous since the size of the source terminal field 52 and information field 54 constrains the number of source 15, 16 (FIG. 1) and destination terminals 18, 19 which can participate in connectionless service.

Referring to FIGS. 1 and 2, the next step in the process relates to formatting each field 44–54 with sufficient information to route the cells 32 from the first source terminal 15 through the network 10 to the first destination terminal 19 and do so in a connectionless manner. To format each field 44–54, the following steps are conducted:

1) For the preferred embodiment of the invention, a predetermined value which is consistent with the preselected AAL protocol is placed in the priority field 46 of each cell 32.
2) For the preferred embodiment of the invention, a predetermined value which is consistent with the preselected AAL protocol is placed in the payload type identification field 48 and is used to identify the last cell of a message.
3) A preselected value is placed in the cell type identifier field 50 in each cell header 34 to indicate that the cell 32 is to be treated in a connectionless manner.
4) A source terminal identifier value 57 is placed in each source terminal identifier field 52. To do so, the following additional steps are conducted:
   a) Each source terminal 15, 16 is assigned a source terminal identifier value 57 which is unique within the network 10.
   b) The first source terminal 15 sending the cells 32 places its source terminal identifier value 57 into the source terminal identifier field 52 of each cell 32 of the cell packet 37.

Figure 4:
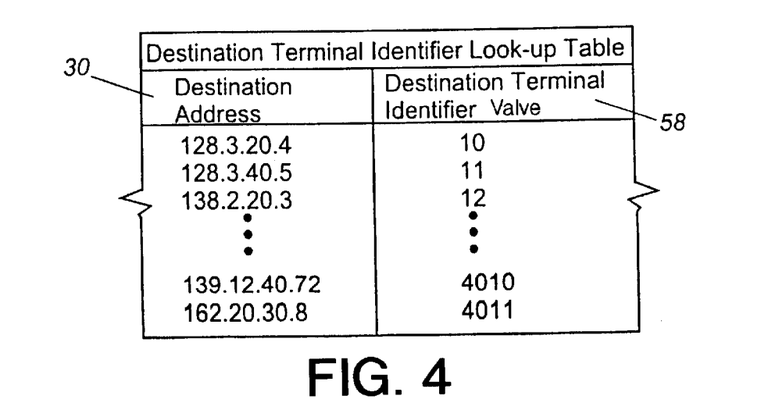
FIG. 4 shows an example of a destination terminal identifier look-up table.

5) Routing information is placed into the information field 54 of each cell header 34 in the form of either a destination terminal identifier value 58 or a outing tag value 60. To place a destination terminal identifier value 58 into each information field 54, the following additional steps are conducted:
   a) Each destination terminal 18, 19 in the network 10 is assigned a destination terminal identifier value 58 which is unique within the network 10.
   b) A destination terminal identifier look-up table (FIG. 4) is obtained or generated by the first source terminal 15 which maps destination addresses 30 to destination terminal identifier values 58.
   c) The destination address 30 (FIG. 2) is identified in the message header 28 of the data packet 24.
   d) The first source terminal look-up table (FIG. 4) is consulted to map the destination address 30 with the corresponding destination terminal identifier value 58.
   e) The first source terminal 15 places the destination terminal identifier value 58 into the information field 54 of each cell 32.

6) For embodiments of the invention which include a header error correction field 44, a predetermined value is placed in the header error correction field 44 and is used for header error correction.

Alternatively, instead of placing a destination terminal identifier value 58 into each information field 54, a routing tag value 60 can be placed into each information field 54. To place a routing tag value 60 into each information field 54, the following steps are conducted (instead of steps a–e above):
   a) A routing tag look-up table (FIG. 5) is generated or obtained by the first source terminal 15 which maps destination addresses 30 to routing tag values 60. Each routing tag 60 provides sufficient information to the network 10 to allow the satellites 12 to route the cells 32 from the first source terminal 15 through each satellite on-board cell switch 61 and to a downlink antenna beam 22 which covers the first destination terminal 19.
   b) The destination address 30 (FIG. 2) is identified in the message header 28 of the data packet 24.
   c) The routing tag look-up table (FIG. 5) is consulted to map the destination address 30 with a routing tag value 60.
   d) The routing tag value 60 is placed into the information field 54 of each cell 32.

Referring to FIGS. 1, 2, 6a and 6b, the next step in the process relates to routing the cells 32 through the network 10 and to the first destination terminal 19. The cells 32 are sent from the first source terminal 15 to a satellite 12 through an uplink antenna beam 21 where the satellite electronics (not shown) are programmed to recognize the cell type identifier field 50 in each cell header 34 and realize that the cells 32 are to be sent in a connectionless manner. Next, the satellite 12 reads the information field 54 which contains either a destination terminal identifier value 58 or a routing tag value 60.

If the information field 54 contains a destination terminal identifier value 58, the destination terminal identifier value 58 is used in conjunction with local satellite look-up tables to route the cells 32. To do so, each satellite 12 generates a destination terminal identifier look-up table, an example of which is of the form shown in FIGS. 6a and 6b, which map destination terminal identifier values 58 to local routing values 62. The satellite electronics identify the destination terminal identifier value 58 in each cell header 34 and consult the local look-up table 64 (FIG. 6a) for a local routing value 62. This local routing value 62 is used to route the cells 32 through the satellite on-board cell switch 61 directly to the correct switch output port 66 on the satellite 12, which may be either a downlink antenna 20 or a crosslink antenna 14. For this embodiment, each satellite 12 has a local look-up table 64 (FIG. 6a) or 67 (FIG. 6b) to accomplish this function, meaning that, the look-up for a destination terminal identifier value 58 for one satellite 12 could result in a local routing value 62 which takes the cell 32 to a crosslink antenna 14 while in another satellite 12, the look-up for the same destination terminal identifier value 58 would result in a local routing value 62 which takes the cells 32 to a downlink antenna 20.

Figure 6A:
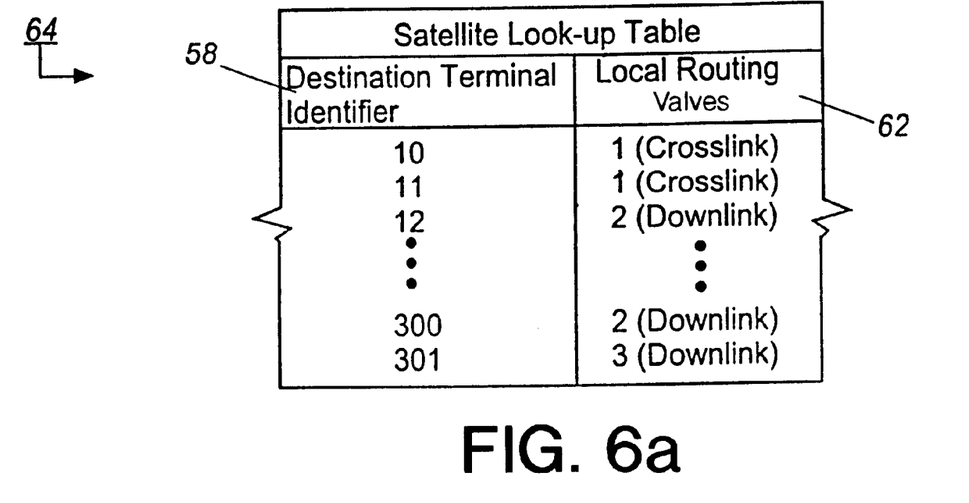
FIG. 6a shows an example of a satellite look-up table.
Figure 6B:
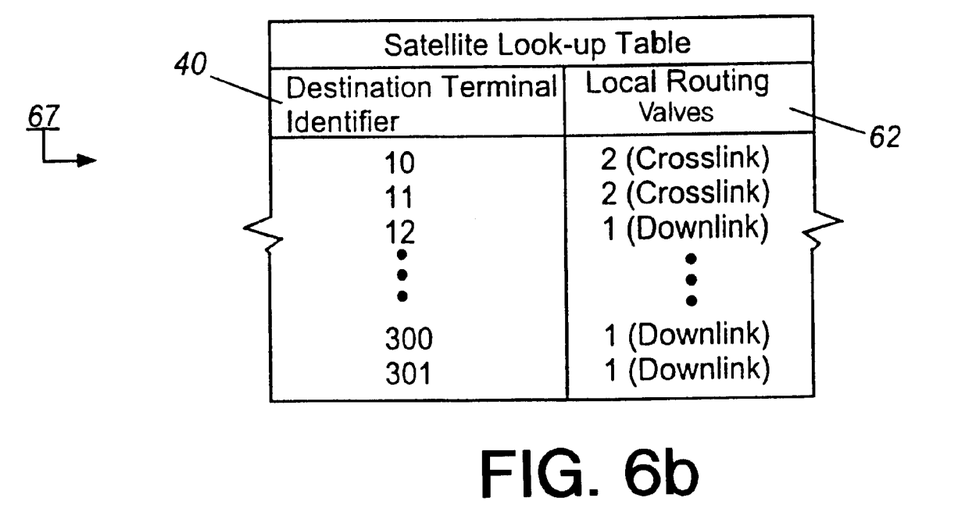
FIG. 6b shows an example of a second satellite look-up table.

For example, in the first satellite local look-up table 64 shown in FIG. 6a, a destination terminal identifier value 58 of "10" routes the cell 32 to switch port 1 which is a crosslink antenna 14 whereas in the second satellite local look-up table 67 shown in FIG. 6b, the destination terminal identifier value 58 of "10" routes the cell 32 to switch port 2 which is a downlink antenna 20. This allows each satellite 12 to determine how to route the cells 32 and does not require the first source terminal 15 or a satellite 12 to provide end-to-end routing information, in this way, each satellite look up table 64 (FIG. 6a) or 66 (FIG. 6b) can be a local table such that a table which is common to the network 10 is not required to route the cells 32.

Figure 5:
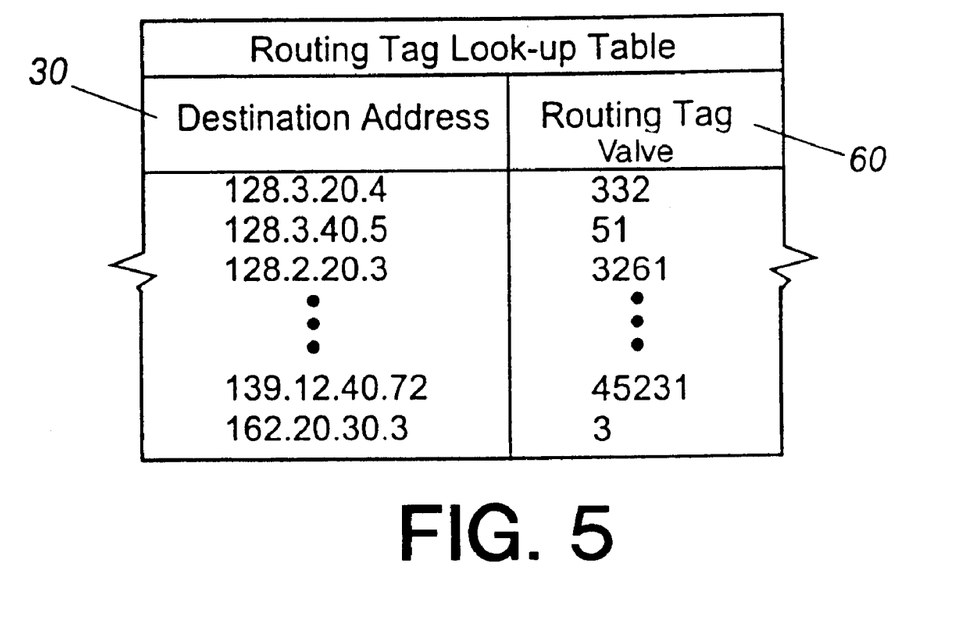
FIG. 5 shows an example of a routing tag value look-up table.

Alternatively, referring to FIGS. 1, 2 and 5, if the information field 54 does not include a destination terminal identifier value 58 but instead contains a routing tag value 60, each satellite 12 uses the routing tag value 60 directly to route the cells 32 to the correct switch output port 66 without the need to generate or consult a local look-up table. For example, referring to FIG. 5, the routing tag value 60 used to send a cell 32 from the first source terminal 15 to the first destination terminal 19 may be 3,3,2 which would indicate that the cell 32 is to be sent to port 3 of satellite number 1 which is a crosslink antenna 14, port 3 of satellite number 2 which is also a crosslink antenna 14, and port 2 of satellite number 3 which is a downlink antenna 20 the downlink antenna beam 22 of which covers the first destination terminal 19.

In one of the above two methods, the cells 32 are routed through each successive satellite on-board cell switch 61 until the cells 32 arrive at the satellite 12 that contains a downlink antenna beam 22 which covers the first destination terminal 19. The cells 32 are broadcast over the selected downlink antenna beam 22. The destination terminals 18 and 19 within the selected downlink antenna beam 22, which includes the first destination terminal 19, receive all the cells 32.

The next step of the process relates to sorting the cells 32. In some networks, if more than one source terminal 15, 16 is sending cells 32 to the same downlink antenna beam 22 at any given time, the cells 32 from different source terminals 15, 16 can become interleaved together prior to transmission over a downlink antenna beam 22. Then, the destination terminals 18, 19 must sort or demultiplex the cells 32 sent to correctly reassemble the data packet 24. In this type of a network, the destination terminals 18, 19 sort the cells 32 by the source terminal identifier value 52.

In some networks, cells 32 from the same source terminal 15 with different priorities may become intermixed as they pass through a satellite onboard cell switch 61. In this type of a network, the value in the cell loss priority field 46 together with the source terminal identifier value 57 is used to demultiplex the cells 32. To do so, the destination terminals 18, 19 first sort the cells 32 by the source terminal identifier value 52 and then further sort those cells 32 by the value in the cell loss priority field 46.

The next step in the process relates to determining for which destination terminal the cells 32 are meant. Since each destination terminal 18, 19 covered by the selected downlink antenna beam 22 receives all the cells 32 sent down the downlink beam 22, each destination terminal 18, 19 must make a decision whether to keep the cells 32 or discard them. For the embodiment of the invention in which the cell header 34 includes a destination terminal identifier value 58, each destination terminal 18, 19 must only identify the destination terminal identifier value 58 in each cell header 34 and determine if the destination terminal identifier value 58 matches either the destination terminal's own identifier or matches a user's identifier 68 which is reachable from the destination terminal 18, 19. If not, the cells 32 are discarded. The first destination terminal 19 having the corresponding destination terminal identifier or which can reach the user 68 which corresponds to the destination terminal identifier value 57 retains all the cells 32 and completely reassembles the data packet 24. If the destination terminal identifier value 58 is the first destination terminal's own identifier, the first destination terminal 19 will keep the data packet 24; otherwise, the first destination terminal 19 will forward the data packet 24 to the user 68 which corresponds to the destination terminal identifier value 58 through a separate network 70 such as an ethernet network, another ATM type network, or any other data transfer network known to one skilled in the art.

For the embodiment of the invention which includes a routing tag value 60 in each cell header 34, sufficient information is not contained in the cell headers 34 to allow the destination terminals 18, 19 to determine for whom the cells 32 are meant. To make this determination, each destination terminal 18, 19 examines the cell bodies 36 of each cell 32 received to identify the destination address 30 which was distributed amongst one or more of the cell bodies 36 during the segmenting and reassembling step described earlier. Each destination terminal 18, 19 can also at least partially reassemble the message header 28 from one or more of the cells 32 and identify the destination address 30 which will be located within the message header 28 once the message header 28 is reassembled. After identifying the destination address 30, each destination terminal 18 & 19 uses known routing mechanisms to determine if the destination address 30 matches either the destination terminal's own address or is reachable from the destination terminal 18 or 19. If not, the destination terminal 18 discards the cells 32.

The present invention provides a method for sending data in a connectionless manner between a source terminal 15 and a destination terminal 19 over a network 10 which supports connection-oriented communications with embodiments of the method being compatible with the ATM protocol and a preselected AAL protocol, particularly, the AAL5 protocol.

It will be appreciated by persons skilled in the art that the present invention is not limited to what has been shown and described hereinabove. The scope of invention is limited solely by the claims which follow.

What is claimed is:

1. A method for transferring a data packet in a connectionless manner between a first source terminal and a first destination terminal, in a communications network which supports connection-oriented communications, said communications network having a plurality of source terminals, destination terminals, uplink and downlink antenna beams with one of said uplink antenna beams covering said first source terminal and one of said downlink antenna beams covering said first destination terminal, said data packet including a destination address identifying a user for which said data packet is directed, the method comprising the steps of:

assigning a source terminal identifier value to each said source terminal in said communications network;

segmenting said data packet into one or more cells, each cell being of a predetermined length a first portion of which comprises a cell header and a second portion of which comprises a cell body;

formatting each said cell header with sufficient information to route said cells from said first source terminal through said network and to said first destination terminal comprising the steps of:

defining a cell type identifier field, a source terminal identifier field and an information field in each cell header, assigning each said destination terminal a destination terminal identifier value, placing a destination terminal identifier value corresponding to said first destination terminal into said information field of each cell header, establishing a destination terminal identifier look-up table on each satellite which correlates destination terminal identifier values to local routing values, each local routing value providing sufficient information to route said cells through a satellite on-board cell switch, placing a source terminal identifier value corresponding to said first source terminal into the source terminal identifier field of each said cell header, and, placing a predetermined value into said information field of each said cell header, said predetermined value providing routing information used by said network to route each said cell from said first source terminal to said first destination terminal;

reading said destination terminal identifier value in each said cell header;

consulting said destination terminal identifier look-up table for a local routing tag;

routing said cells through said on-board cell switch;

repeating the reading, consulting and routing steps by each satellite receiving said cells until one said satellite routes said cells to said downlink antenna beam which covers said first destination terminal;

broadcasting said cells over said downlink antenna beam; and receiving said cells by destination terminals located within said downlink antenna beam, one of said destination terminals being said first destination terminal.

2. The method as in claim 1, further comprising the steps of:

sorting said cells by said destination terminal identifier value by said destination terminals receiving said cells;

recognizing said destination terminal identifier value is said first destination terminal's identifier;

reassembling said cells into said data packet by said first destination terminal; and, discarding said cells by all other destination terminals.

3. A method for transferring a data packet in a connectionless manner between a first source terminal and a first destination terminal, in a communications network which supports connection-oriented communications, said communications network having a plurality of source terminals, destination terminals, uplink and downlink antenna beams with one of said uplink antenna beams covering said first source terminal and one of said downlink antenna beams covering said first destination terminal, said data packet including a destination address identifying a user for which said data packet is directed, the method comprising the steps of:

assigning a source terminal identifier value to each said source terminal in said communications network;

segmenting said data packet into one or more cells, each cell being of a predetermined length a first portion of which comprises a cell header and a second portion of which comprises a cell body;

formatting each said cell header with sufficient information to route said cells from said first source terminal through said network and to said first destination terminal comprising the steps of:

defining a cell type identifier field, a source terminal identifier field and an information field in each cell header;

placing a predetermined value into said cell type identifier field of each said cell header to identify said cells are to be treated in a connectionless manner, and placing a source terminal identifier value corresponding to said first source terminal into the source terminal identifier field of each said cell header;

establishing a first source terminal look-up table by said first source terminal in said network, said first source terminal look-up table correlating destination addresses to routing tag values, each said routing tag value providing sufficient information to route said cells from said first source terminal through a plurality of satellite on-board cell switches to said first destination terminal, and, placing a routing tag corresponding to the first destination terminal into said information field of each cell header;

using said value in said information field to route said cells from said first source terminal through said uplink antenna beam through a satellite network having a plurality of satellites, each having an on-board satellite cell-switch to said downlink antenna beam;

broadcasting said cells over said downlink antenna beam; and receiving said cells by destination terminals located within said downlink antenna beam, one of said destination terminals being said first destination terminal.

4. The method of claim 3, further comprising the steps of:

examining said cell body of each cell received by said destination terminals until said destination address has been identified;

determining by said first destination terminal that said user corresponding to said destination address is reachable by said first destination terminal; and, assembling said cells back into said data packet by said first destination terminal.

5. The method of claim 4, further comprising the steps of:

determining by other destination terminals receiving said cells that said user corresponding to said destination address is unreachable; and, discarding said cells by destination terminals which cannot reach said user.

6. The method of claim 4, wherein the step of examining said cell body of each cell received by said destination terminals until said destination address has been identified comprises the step of:

reassembling said cells back into at least a partial said data packet by each destination terminal located within said downlink beam such that said destination address is reassembled.

7. A method for transferring a data packet in a connectionless manner between a first source terminal and a first destination terminal, in a communications network which supports connection-oriented communications and which uses the Asynchronous Transfer Mode for data message transfers, said communications network having a plurality of source terminals, destination terminals, uplink and downlink antenna beams with one of said uplink antenna beams covering said first source terminal and one of said downlink antenna beams covering said first destination terminal, said data packet including a destination address identifying a user for which said data packet is directed, the method comprising the steps of:

assigning a source terminal identifier value to each said source terminal in said communications network;

segmenting said data packet into one or more cells, each cell having a length of 53 octets, a first preselected number of octets which is greater than the first five octets comprising a cell header;

formatting each said cell header with sufficient information to route said cells from said first source terminal through said network and to said first destination terminal comprising the steps of:

defining a cell type identifier and a source terminal identifier field within the first five octets of said cell header and said information field after said first five octets within said cell header, placing a predetermined value into said cell type identifier field of each said cell header to identify said cells are to be treated in a connectionless manner, placing a source terminal identifier value corresponding to said first source terminal into the source terminal identifier field of each said cell header, and, placing a predetermined value into said information field of each said cell header, said predetermined value providing routing information used by said network to route each said cell from said first source terminal to said first destination terminal;

using said value in said information field to route said cells from said first source terminal through said uplink antenna beam to said downlink antenna beam through broadcasting said cells over said downlink antenna beam;

receiving said cells by destination terminals located within said downlink antenna beam, one of said destination terminals being said first destination terminal; and sorting said cells by source terminal identifier value by said destination terminals located within said downlink antenna beam.

8. A method for transferring a data packet in a connectionless manner between a first source terminal and a first destination terminal, in a communications network which uses the Asynchronous Transfer Mode (ATM) and a preselected ATM Adaption Layer (AAL) Protocol for data message transfers, said network additionally supports connection-oriented communications, said communications network having a plurality of source terminals, destination terminals, and satellites each of which has uplink and downlink antenna beams, one of said uplink antenna beams covers said first source terminal and one of said downlink antenna beams covers said first destination terminal, said data packet comprising a destination address identifying a user for which said data packet is directed, the method comprising the steps of:

assigning a source terminal identifier value to each said source terminal in said communications network;

segmenting said data packet into one or more cells in accordance with said AAL Protocol to generate a plurality of cells, each of which has a predetermined length of which a predetermined portion comprises a cell header and a second predetermined portion of which comprises a cell body;

assigning fields within each cell header in accordance with said AAL Protocol, said fields comprising a virtual path identifier (VPI) field, a virtual communication identifier (VCI) field, a header error correction (HEC) field, a cell loss priority field and a payload type identifier field;

retaining said cell loss priority field and said payload type identifier field in each cell header;

deleting said VCI, VPI and HEC fields in each cell header;

replacing said VCI, VPI and HEC fields with three new fields comprising a cell type identifier field, a source terminal identifier field and an information field;

formatting each field of said cell header with sufficient information to route said cells from said first source terminal through said network and to said first destination terminal comprising the steps of:

placing a predetermined value in each said cell type identifier field in accordance with said AAL Protocol to identify that each said cell is to be treated in a connectionless manner, placing a predetermined value in each said cell loss priority field in accordance with said AAL Protocol to indicate a priority of said cell, placing a predetermined value in each said payload type identifier field to indicate a last cell of a message in accordance with said AAL Protocol, placing a source terminal identifier value corresponding to said first source terminal into each said source terminal identifier field, and, placing a preselected value into said information field of each said cell header, said preselected value providing routing information used by said network to route each said cell from said first source terminal through one or more satellites to said first destination terminal;

transmitting said cells through said uplink antenna beam to one of the satellites;

using said value in said information field to route each cell through one or more of the satellite on-board cell switches to a downlink antenna beam covering said first destination terminal;

broadcasting said cells over said downlink antenna beam; and, receiving said cells by destination terminals located within said downlink antenna beam, one of said destination terminals being said first destination terminal.

9. The method of claim 8, further comprising the step of:

sorting said cells by source terminal identifier by said destination terminals, located within said downlink antenna beam.

10. The method as in claim 9, further comprising the step of sorting said cells by said value in said priority field.

11. The method of claim 8, wherein the step of placing a preselected value into said information field of each said cell header, further comprises the steps of:

assigning each said destination terminal a destination terminal identifier value;

placing a destination terminal identifier value corresponding to the first destination terminal into said information field of each cell header;

establishing a destination terminal identifier look-up table on each satellite which correlates destination terminal identifier values to local routing values, each local routing value providing sufficient information to route said cells through a satellite on-board cell switch; and, the step of using said value in said information field to route each cell further comprises the steps of:

reading said destination terminal identifier value in each said cell header by a satellite;

consulting said destination terminal identifier look-up table for a local routing value;

routing said cells through said on-board cell switch; and, repeating the reading, consulting and routing steps by each satellite receiving said cells until one said satellite routes said cells to said downlink antenna beam which covers said first destination terminal.

12. The method as in claim 11, further comprising the steps of:

sorting said cells by said destination terminal identifier value by said destination terminals receiving said cells;

recognizing said destination terminal identifier value is said first destination terminal's identifier;

reassembling said cells into said data packet by said first destination terminal; and, discarding said cells by all other destination terminals.

13. The method as in claim 8 wherein the step of placing a predetermined value into said information field of each cell header, said predetermined value used by said network to route each said cell to said first destination terminal, further comprises the steps of:

establishing a first source terminal look-up table by said first source terminal in said network, said first source terminal look-up table correlating destination addresses to routing tag values, each said routing tag value providing sufficient information to route said cells from said first source terminal through a plurality of satellite on-board cell switches to said first destination terminal; and, placing the routing tag value into said information field of each cell header.

14. The method of claim 13, further comprising the steps of:

examining said cell body of each cell received by said destination terminals until said destination address has been identified;

determining by said first destination terminal that said user corresponding to said destination address is reachable by said first destination terminal; and, reassembling said data packet by said first destination terminal.

15. The method of claim 14, further comprising the steps of:

determining by other destination terminals receiving said cells that said user corresponding to said destination address is unreachable; and, discarding said cells by destination terminals which cannot reach said user.

16. The method of claim 14, wherein the step of examining said cell body of each cell received by said destination terminals until said destination address has been identified further comprises the step of:

reassembling said cells back into at least a partial said data packet by each destination terminal located within said downlink beam such that said destination address is reassembled.

17. The method as in claim 8, wherein the step of segmenting said data packet into one or more cells each cell having a preselected length further comprises the step of:

segmenting said data packet into one or more cells, each cell having a length of 53 octets a preselected number of which comprises said cell header.

18. The method of claim 17, wherein the step of placing a predetermined value into said information field of each said cell header, further comprises the steps of:

assigning each said destination terminal a destination terminal identifier value, placing a destination terminal identifier value corresponding to said first destination terminal into said information field of each cell header, establishing a destination terminal identifier look-up table correlating destination terminal identifier values to local routing values, each said local routing value providing sufficient information to route said cells through a satellite on-board cell switch; and, the step of using said value in said information field to route each cell further comprises the steps of:

reading said destination terminal identifier value in each said cell header by a satellite;

consulting said destination terminal identifier look-up table for a local routing value;

routing said cells through said on-board cell switch;

repeating the reading, consulting and routing steps by each satellite receiving said cells until one said satellite routes said cells to said downlink antenna beam which covers said first destination terminal.

19. The method as in claim 18, further comprising the steps of:

sorting said cells by said destination terminal identifier value by said destination terminals receiving said cells;

recognizing said destination terminal identifier value is said first destination terminal's identifier;

reassembling said cells into said data packet by said first destination terminal; and, discarding said cells by all other destination terminals.

20. The method as in claim 19, wherein the step of placing a predetermined value into said information field of each cell header, said predetermined value used by said network to route each said cell to said first destination terminal, further comprises the steps of:

establishing a first source terminal look-up table by said first source terminal in said network, said first source terminal look-up table correlating destination addresses to routing tag values, each said routing tag value providing sufficient information to route said cells from said first source terminal through a plurality of satellite on-board cell switches to said first destination terminal; and, placing the routing tag value into said information field of each cell header.

21. The method of claim 20, further comprising the steps of:

examining said cell body of each cell received by said destination terminals until said destination address has been identified;

determining by said first destination terminal that said user corresponding to said destination address is reachable by said first destination terminal; and, reassembling said data packet by said first destination terminal.

22. The method of claim 18, further comprising the steps of:

determining by other destination terminals receiving said cells that said user corresponding to said destination address is unreachable; and, discarding said cells by destination terminals which cannot reach said user.

23. The method of claim 21, wherein the step of examining said cell body of each cell received by said destination terminals until said destination address has been identified further comprises the steps of:

reassembling said cells back into at least a partial said data packet by each destination terminal located within said downlink beam such that said destination address is reassembled.

24. The method of claim 8, wherein the step of segmenting said data packet into one or more cells each cell having a predetermined length further comprises the step of:

segmenting said data packet into one or more cells, each cell having a length of 53 octets a first five octets of which comprises said cell header.

25. The method of claim 8, wherein the step of segmenting said data packet into one or more cells, each cell having a predetermined length further comprises the steps of:

segmenting said data packet into one or more cells, each cell having a length of 53 octets, a first preselected number of octets which is greater than the first five octets comprising a cell header;

locating said cell type identifier, source terminal identifier field, payload type identifier and cell loss priority field within the first five octets of each cell; and, locating said information field within each cell header and after said first five octets of said cell.

* * * * *